US011881345B2

(12) United States Patent
Koo et al.

(10) Patent No.: US 11,881,345 B2
(45) Date of Patent: Jan. 23, 2024

(54) COIL COMPONENT

(71) Applicant: SAMSUNG ELECTRO-MECHANICS CO., LTD., Suwon-si (KR)

(72) Inventors: Gun Woo Koo, Suwon-si (KR); Sung Min Song, Suwon-si (KR); Hwan Soo Lee, Suwon-si (KR); Hwi Dae Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 922 days.

(21) Appl. No.: 16/402,520

(22) Filed: May 3, 2019

(65) Prior Publication Data

US 2020/0279687 A1 Sep. 3, 2020

(30) Foreign Application Priority Data

Feb. 28, 2019 (KR) ........................ 10-2019-0023544

(51) Int. Cl.
*H01F 5/00* (2006.01)
*H01F 27/29* (2006.01)
(Continued)

(52) U.S. Cl.
CPC ......... *H01F 27/29* (2013.01); *H01F 27/2804* (2013.01); *H01F 27/323* (2013.01);
(Continued)

(58) Field of Classification Search
USPC .......................................................... 336/200
See application file for complete search history.

(56) References Cited

U.S. PATENT DOCUMENTS 6,727,782 B2 4/2004 Sasaki et al.
10,141,097 B2 11/2018 Jeong et al.
(Continued)

FOREIGN PATENT DOCUMENTS

CN 1402426 A 3/2003
CN 105702417 A 6/2016
(Continued)

OTHER PUBLICATIONS

Chinese Office Action dated Mar. 8, 2023, issued in corresponding Chinese Patent Application No. 201910559822.6 with English translation.

(Continued)

*Primary Examiner* — Ronald Hinson
(74) *Attorney, Agent, or Firm* — Morgan, Lewis & Bockius LLP

(57) ABSTRACT

A coil component includes a body, an internal insulating layer disposed in the body, and a coil portion disposed on the internal insulating layer. The coil portion includes first and second coil patterns disposed on opposing surfaces of the internal insulating layer, respectively, first main and first auxiliary lead-out portions extending from the first coil pattern and respectively exposed to a front surface and one side surface of the body connected to each other, and second main and second auxiliary lead-out portions extending from the second coil pattern and respectively exposed to a rear surface and another side surface of the body connected to each other.

21 Claims, 3 Drawing Sheets

1000

(51) Int. Cl.
*H01F 27/28* (2006.01)
*H01F 41/12* (2006.01)
*H01F 41/04* (2006.01)
*H01F 27/32* (2006.01)

(52) U.S. Cl.
CPC ......... *H01F 41/041* (2013.01); *H01F 41/122* (2013.01); *H01F 2027/2809* (2013.01)

(56) References Cited

U.S. PATENT DOCUMENTS

| | | | | |
|---|---|---|---|---|
| 2003/0030510 | A1* | 2/2003 | Sasaki | H03H 7/0115 333/185 |
| 2004/0145442 | A1* | 7/2004 | Matsutani | H01F 21/12 336/200 |
| 2016/0078986 | A1 | 3/2016 | Yoon et al. | |
| 2016/0172102 | A1* | 6/2016 | Jeong | H01F 27/255 29/605 |
| 2017/0169933 | A1 | 6/2017 | Kim | |
| 2017/0194089 | A1* | 7/2017 | Jang | H01F 27/29 |
| 2017/0287619 | A1 | 10/2017 | Sim et al. | |
| 2018/0012696 | A1 | 1/2018 | Lee et al. | |
| 2018/0047494 | A1 | 2/2018 | Yoo et al. | |
| 2018/0145653 | A1 | 5/2018 | Ishizuka | |

FOREIGN PATENT DOCUMENTS

| | | | |
|---|---|---|---|
| CN | 207818307 | U | 9/2018 |
| JP | 2010-62502 | A | 3/2010 |
| JP | 2014-197590 | A | 10/2014 |
| JP | 2018-74072 | A | 5/2018 |
| KR | 10-2018-0006246 | A | 1/2018 |
| KR | 10-2018-0017479 | A | 2/2018 |

OTHER PUBLICATIONS

Chinese Office Action dated Aug. 30, 2023, issued in corresponding Chinese Patent Application No. 201910559822.6 with English translation.

* cited by examiner

COIL COMPONENT

CROSS-REFERENCE TO RELATED APPLICATION(S)

This application claims benefit of priority to Korean Patent Application No. 10-2019-0023544 filed on Feb. 28, 2019 in the Korean Intellectual Property Office, the disclosure of which is incorporated herein by reference in its entirety.

BACKGROUND

The present disclosure relates to a coil component.

An inductor, a coil component, is a representative passive electronic component used together with a resistor and a capacitor in electronic devices.

In a case of a coil component in which a value of a length of a body is similar to a value of a width, it may be difficult to specify the surface to which a lead-out portion of a coil portion is exposed, and as a result, it may be difficult to specify the surface on which an external electrode is to be disposed.

SUMMARY

An aspect of the present disclosure is to provide a coil component which may be easily manufactured.

According to an aspect of the present disclosure, a coil component includes a body having one surface and another surface opposing each other, and a plurality of walls each connecting the one surface to the other surface, an internal insulating layer disposed in the body, and a coil portion disposed on the internal insulating layer. The coil portion includes first and second coil patterns disposed on opposing surfaces of the internal insulating layer, respectively, a first main lead-out portion and a first auxiliary lead-out portion extending from the first coil pattern and respectively exposed to a front surface and one side surface of the body connected to each other among the plurality of walls of the body, and a second main lead-out portion and a second auxiliary lead-out portion extending from the second coil pattern and respectively exposed to a rear surface and another side surface of the body connected to each other among the plurality of walls of the body.

According to another aspect of the present disclosure, a coil component includes a body and a coil disposed in the body and including at least one coil winding between opposing first and second ends thereof. The first end of the coil includes a first main lead-out portion and a first auxiliary lead-out portion exposed to different respective surfaces of the body at locations spaced apart from each other.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
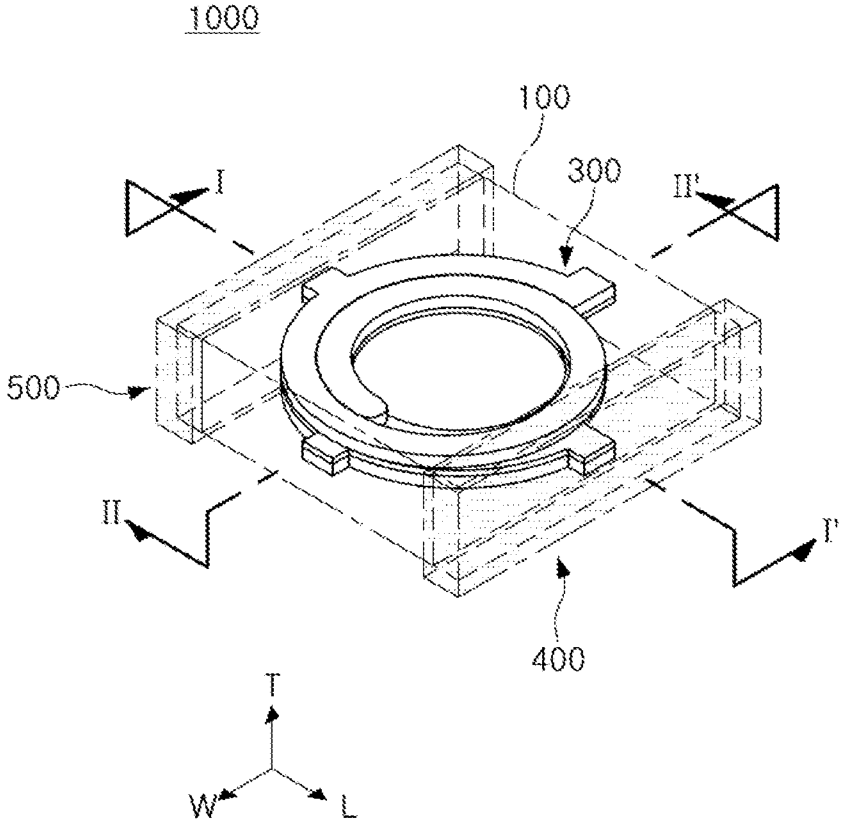
FIG. 1 is a schematic perspective diagram illustrating a coil component according to an example embodiment of the present disclosure.

Hereinafter, embodiments of the present disclosure will be described as follows with reference to the attached drawings.

The terms used in the exemplary embodiments are used to simply describe an exemplary embodiment, and are not intended to limit the present disclosure. A singular term includes a plural form unless otherwise indicated. The terms "include," "comprise," "is configured to," etc. of the description are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a gravity direction.

The term. "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and exemplary embodiments in the present disclosure are not limited thereto.

In the drawings, an L direction is a first direction or a length direction, a W direction is a second direction or a width direction, a T direction is a third direction or a thickness direction.

In the descriptions described with reference to the accompanied drawings, the same elements or elements corresponding to each other will be described using the same reference numerals, and overlapped descriptions will not be repeated.

In electronic devices, various types of electronic components may be used, and various types of coil components may be used between the electronic components to remove noise, or for other purposes.

In other words, in electronic devices, a coil component may be used as a power inductor, a high frequency inductor, a general bead, a high frequency bead, a common mode filter, and the like.

Embodiment

Figure 2:
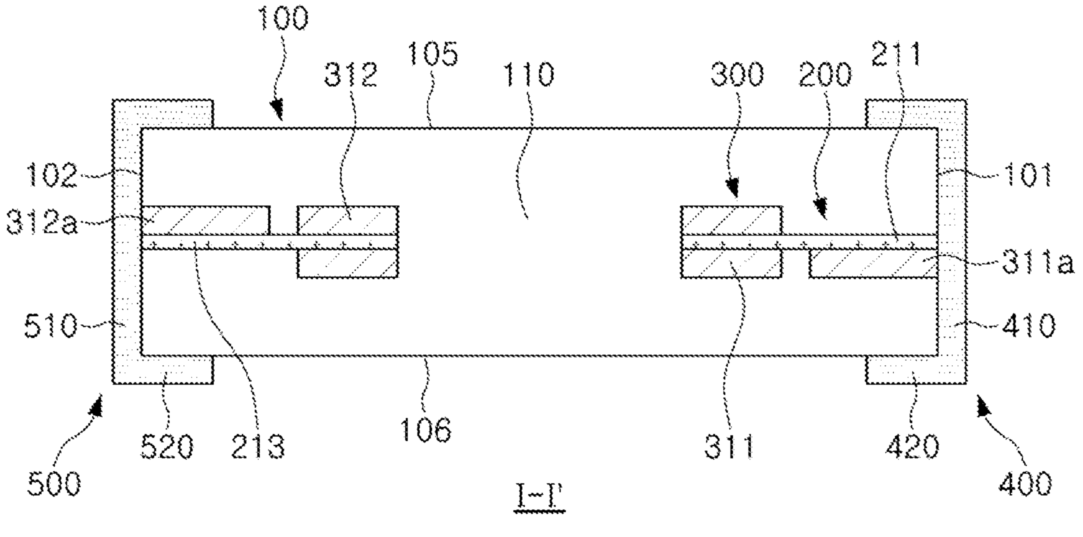
FIG. 2 is a cross-sectional diagram taken along line I-I' in FIG. 1.
Figure 3:
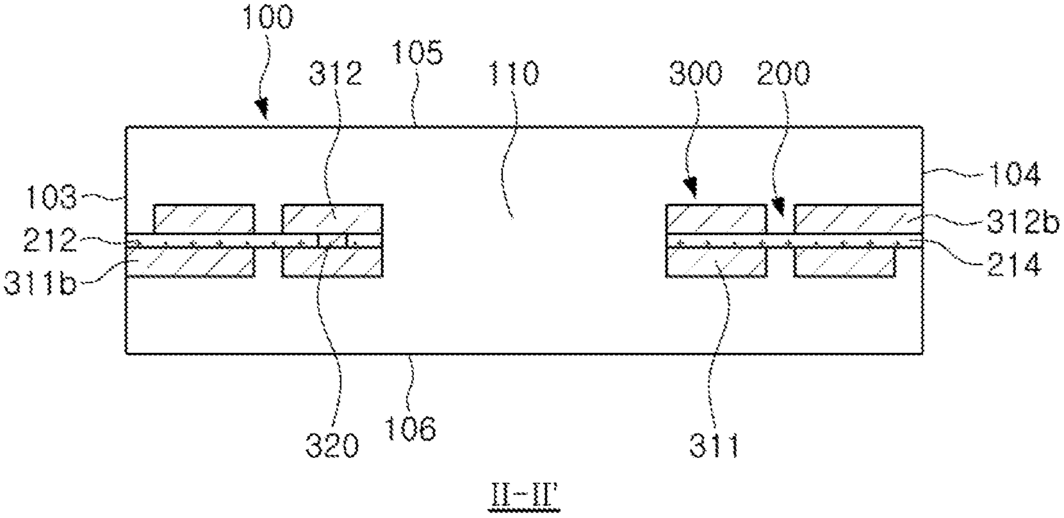
FIG. 3 is a cross-sectional diagram taken along line II-II' in FIG. 1.
Figure 4:
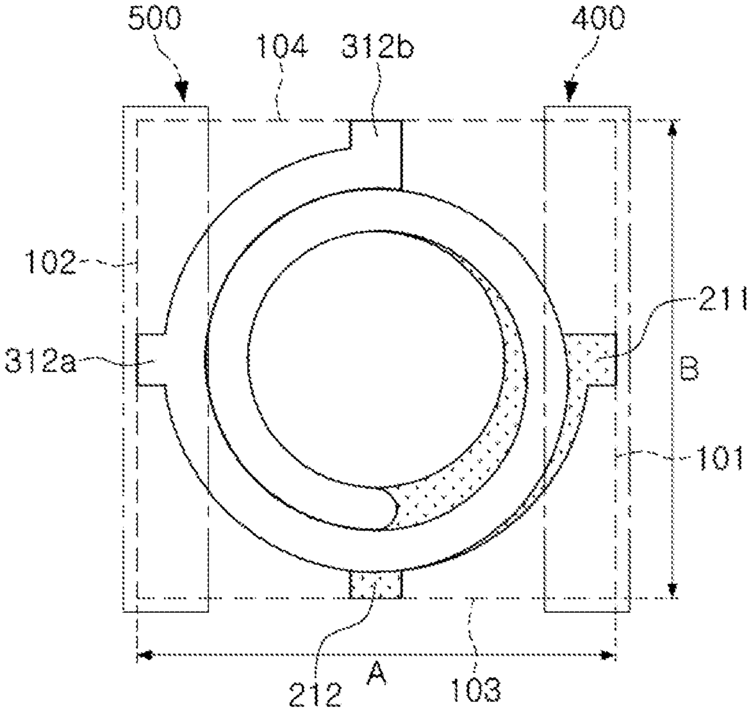
FIGS. 4 and 5 are diagrams illustrating a position in which an external electrode may be formed, viewed from above.
Figure 5:
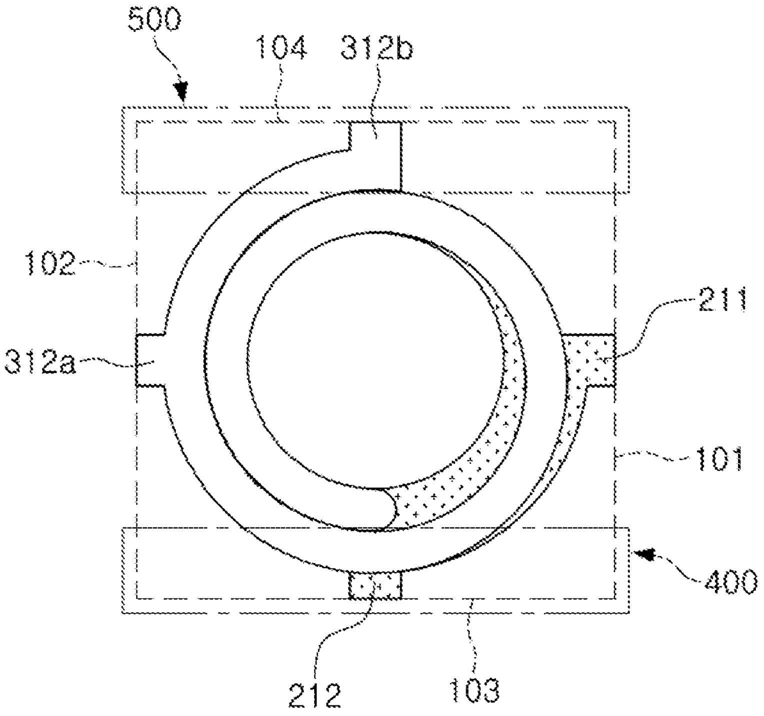

FIG. 1 is a schematic perspective diagram illustrating a coil component according to an example embodiment. FIG. 2 is a cross-sectional diagram taken along line I-I' in FIG. 1. FIG. 3 is a cross-sectional diagram taken along line II-II' in FIG. 1. FIGS. 4 and 5 are diagrams illustrating a position in which an external electrode is formed, viewed from above.

Referring to FIGS. 1 to 5, a coil component 1000 may include a body 100, an internal insulating layer 200, a coil portion 300, and first and second external electrode 400 and 500.

The body 100 may form an exterior of the coil component 1000. The body 100 may have a hexahedral shape.

In the description below, an example in which the body 100 has a hexahedral shape is presented, but an embodiment is not limited thereto.

Referring to FIGS. 2 to 5, the body 100 may include a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. The first to fourth surfaces 101, 102, 103, and 104 of the body 100 may correspond to walls of the body connecting the fifth surface 105 and the sixth surface 106 of the body. In the description below, front and rear surfaces opposing each other among the plurality of walls of the body may refer to the first surface 101 and the second surface 102, and both side surfaces of the body opposing each other among the plurality of walls of the body 100 may refer to the third surface 103 and the fourth surface 104 of the body.

As an example, the body 100 may have a length of 4.0 mm, a width of 4.0±0.2 mm, and a thickness of 1.0 mm. In other words, referring to FIGS. 4 and 5, a distance A between the first surface 101 and the second surface 102 of the body 100 may be 4.0 mm, and a distance between the third surface 103 and the fourth surface 104 of the body 100 may be 4.0±0.2 mm. Thus, an absolute value of a difference between the length A and the width B of the body may be 0.2 mm or less. However, an example embodiment thereof is not limited to the size of the body 100 described above. Even though the size of the body is different from the aforementioned example, an example in which a length and a width of the body 100 are similar to each other such that it may be difficult to identify a length direction and a width direction of the body 100 by only an exterior of the body 100 may also be included in the scope of the present disclosure. The above-described size of the body 100 does not reflect a process error, and the like, and thus, an actual size of the body 100 may be different from the above-mentioned values due to a process error, and the like.

The body 100 may include a magnetic material and a resin material. For example, the body 110 may be formed by layering one or more magnetic composite sheets including a magnetic material dispersed in a resin. Alternatively, the body 100 may have a structure different from the structure in which a magnetic material is dispersed in a resin. For example, the body 100 may be formed of a magnetic material such as a ferrite.

The magnetic material may be a ferrite or a magnetic metal powder.

The ferrite may include, for example, one or more materials among a spinel ferrite such as an Mg—Zn ferrite, an Mn—Zn ferrite, an Mn—Mg ferrite, a Cu—Zn ferrite, an Mg—Mn—Sr ferrite, an Ni—Zn ferrite, and the like, a hexagonal ferrite such as a Ba—Zn ferrite, a Ba—Mg ferrite, a Ba—Ni ferrite, a Ba—Co ferrite, a Ba—Ni—Co ferrite, and the like, a garnet ferrite such as a Y ferrite, and a Li ferrite.

The magnetic metal powder may include one or more elements selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal powder may be one or more materials among a pure iron powder, a Fe—Si alloy powder, a Fe—Si—Al alloy powder, a Fe—Ni alloy powder, a Fe—Ni—Mo alloy powder, Fe—Ni—Mo—Cu alloy powder, a Fe—Co alloy powder, a Fe—Ni—Co alloy powder, a Fe—Cr alloy powder, a Fe—Cr—Si alloy powder, a Fe—Si—Cu—Nb alloy powder, a Fe—Ni—Cr alloy powder, and a Fe—Cr—Al alloy powder.

The magnetic metal powder may be amorphous or crystalline. For example, the magnetic metal powder may be a Fe—Si—B—Cr amorphous alloy powder, but an exemplary embodiment of the magnetic metal powder is not limited thereto.

The ferrite and the magnetic metal powder may have an average diameter of 0.1 μm to 30 μm, but an example of the average diameter is not limited thereto.

The body 100 may include two or more types of magnetic materials dispersed in a resin. The notion that types of the magnetic materials are different may indicate that one of an average diameter, a composition, crystallinity, and a form of one of the magnetic materials is different from those of the other magnetic material.

The resin may include one of an epoxy, a polyimide, a liquid crystal polymer, or mixture thereof, but the example of the resin is not limited thereto.

The body 100 may include a core 110 penetrating through the coil portion 300 and the internal insulating layer 200. The core 110 may be formed by filling a through hole of the coil portion 300 and/or of the internal insulating layer 200 with a magnetic composite sheet, but an exemplary embodiment thereof is not limited thereto.

The internal insulating layer 200 may be buried in the body 100. The internal insulating layer 200 may include the coil portion 300. The internal insulating layer 200 may support the coil portion 300.

The internal insulating layer 200 may be formed of an insulating material including a thermosetting insulating resin such as an epoxy resin, a thermoplastic insulating resin such as a polyimide, or a photosensitive insulating resin, or may be formed of an insulating material in which a reinforcing material such as a glass fiber or an inorganic filler is impregnated with such an insulating resin. For example, the internal insulating layer 200 may be formed of an insulating material such as prepreg, Ajinomoto Build-up Film (ABF), FR-4, a bismaleimide triazine (BT) resin, a photoimageable dielectric (PID), and the like, but an example of the material of the internal insulating layer is not limited thereto.

As an inorganic filler, one or more elements selected from a group consisting of silica ($SiO_2$), alumina ($Al_2O_3$), silicon carbide (SiC), barium sulfate ($BaSO_4$), talc, mud, a mica powder, aluminium hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the internal insulating layer 200 is formed of an insulating material including a reinforcing material, the internal insulating layer 200 may provide improved stiffness. When the internal insulating layer 200 is formed of an insulating material which does not include a glass fiber, the internal insulating layer 200 may be desirable to reducing an overall thickness of the coil component 1000. When the internal insulating layer 200 is formed of an insulating material including a photosensitive insulating resin, the number of processes may be reduced such that manufacturing costs may be reduced, and a fine via may easily be processed.

The coil portion 300 in the example embodiment may include at least one coil winding or turn (and potentially plural coil windings or turns) between opposing first and second ends thereof. For example, the coil portion 300 may include a first coil pattern 311 and a second coil pattern 312 connected in series between the first and second ends thereof. The coil portion 300 may further include a first main lead-out portion 311*a* and a first auxiliary lead-out portion 311*b* at the first end thereof, and a second main lead-out portion 312*a* and a second auxiliary lead-out portion 312*b* at the second end thereof.

The internal insulating layer 200 may extend to be exposed to a support portion disposed in a central region of the body 100 to support the first and second coil patterns 311 and 312 and exposed to the first to fourth surfaces 101, 102, 103, and 104 of the body 100 from the support portion, and may include first to fourth protrusions 211, 212, 213, and 214 respectively supporting the first main lead-out portion 311*a*, the first auxiliary lead-out portion 311*b*, the second main lead-out portion 312*a*, and the second auxiliary lead-out portion 312*b*.

Referring to FIGS. 2 and 3, for example, the first main lead-out portion 311*a* may be disposed on a lower surface of the first protrusion 211, the first auxiliary lead-out portion 311*b* may be disposed on a lower surface of the second protrusion 212, the second main lead-out portion 312*a* may be disposed on an upper surface of the third protrusion 213, and the second auxiliary lead-out portion 312*b* may be disposed on an upper surface of the fourth protrusion 214, respectively, in the directions indicated in FIGS. 2 and 3.

As a result, the first protrusion 211 and the first main lead-out portion 311*a* may be exposed to the first surface 101 of the body, the second protrusion 212 and the first auxiliary lead-out portion 311*b* may be exposed to the third surface 103 of the body 100, the third protrusion 213 and the second main lead-out portion 312*a* may be exposed to the second surface 102, and the fourth protrusion 214 and the second auxiliary lead-out portion 312*b* may be exposed to the fourth surface 104 of the body 100. Thus, due to the first to fourth protrusions 211, 212, 213, and 214, the internal insulating layer 200 may be exposed to the first to fourth surfaces 101, 102, 103, and 104 of the body 100, respectively.

The coil portion 300 may be disposed on the internal insulating layer 200 and may be buried in the body 100, and may embody properties of the coil component. For example, when the coil component 1000 is used as a power inductor, the coil portion 300 may store an electric field as a magnetic field such that an output voltage may be maintained, thereby stabilizing power of an electronic device.

The coil portion 300 in the example embodiment may include the first coil pattern 311, the second coil pattern 312, the first main lead-out portion 311*a*, the first auxiliary lead-out portion 311*b*, the second main lead-out portion 312*a*, the second auxiliary lead-out portion 312*b*, and a via 320.

The first coil pattern 311, the internal insulating layer 200, and the second coil pattern 312 may be layered in order in a thickness direction T of the body 100.

The first coil pattern 311 and the second coil pattern 312 may have a planar spiral shape. As an example, the first coil pattern 311 may form at least one turn with reference to or around a core 110 of the body on one surface (e.g., on a lower surface of the internal insulating layer 200 with reference to FIG. 2) of the internal insulating layer 200. The second coil pattern 312 may form at least one turn with reference to or around the core 110 of the body on the other surface (e.g., on an upper surface of the internal insulating layer 200 with reference to FIG. 2) of the internal insulating layer 200. The first coil pattern 311 and the second coil pattern 312 may be coiled or wound in the same direction.

The first main lead-out portion 311*a* and the first auxiliary lead-out portion 311*b* may extend from the first coil pattern 311, and may be spaced apart from each other and exposed to the first and third surfaces 101 and 103 of the body 100, respectively. For example, the first main lead-out portion 311*a* may only be exposed to the first surface 101 of the body 100, and the first auxiliary lead-out portion 311*b* may only be exposed to the third surface 103 of the body 100.

The second main lead-out portion 312*a* and the second auxiliary lead-out portion 312*b* may extend from the second coil pattern 312, and may be spaced apart from each other and exposed to the second and fourth surfaces 102 and 104 of the body 100, respectively. For example, the second main lead-out portion 312*a* may only be exposed to the second surface 102 of the body 100, and the second auxiliary lead-out portion 312*b* may only be exposed to the fourth surface 104 of the body 100.

As a result, the coil component 1000 in the example embodiment may be configured such that, regardless of the pair of opposing side surfaces identified in a process of identifying and specifying surfaces on which first and second external electrodes 400 and 500 are formed among the surfaces of the body 100, the first and second external electrodes 400 and 500 may easily be connected to the coil portion 300. Thus, even when it is difficult to identify a width direction and a length direction in the case that a width and a length of the body 100 are similar to each other, by disposing the first and second external electrodes 400 and 500 on two surfaces opposing each other among the first to fourth surfaces 101, 102, 103, and 104 of the body 100, the first and second external electrodes 400 and 500 may be connected to opposing ends of the coil portion 300.

For example, as illustrated in FIG. 4, the first and second external electrodes 400 and 500 may be formed on the first and second surfaces 101 and 102 of the body 100 opposing each other in a length direction L of the body 100, or as illustrated in FIG. 5, the first and second external electrodes 400 and 500 may be formed on the third and fourth surfaces 103 and 104 of the body 100 opposing each other in a width direction W of the body 100, thereby easily connecting the first and second external electrodes 400 and 500 to the coil portion 300. Accordingly, the coil component 100 in the example embodiment may not require any identification mark, generally used when the first and second external electrodes 400 and 500 are formed.

The first main lead-out portion 311*a* and the first auxiliary lead-out portion 311*b* may be formed in the same process as the process of forming the first coil pattern 311, and a boundary may not be formed therebetween. Thus, the first main lead-out portion 311*a*, the first auxiliary lead-out portion 311*b*, and the first coil pattern 311 may be integrated with each other. The second main lead-out portion 312*a* and the second auxiliary lead-out portion 312*b* may be formed in the same process as the process of forming the second coil pattern, and a boundary may not be formed therebetween. Thus, second main lead-out portion 312*a*, the second auxiliary lead-out portion 312*b*, and the second coil pattern may be integrated with each other.

An area of the first main lead-out portion 311*a* exposed to the first surface 101 of the body 100, an area of the first auxiliary lead-out portion 311*b* exposed to the third surface 103 of the body 100, an area of the second main lead-out portion 312*a* exposed to the second surface 102 of the body 100, and an area of the second auxiliary lead-out portion 312*b* exposed to the fourth surface 104 of the body 100 may be substantially the same. In this case, irrespective of the surfaces on which the first and second external electrodes 400 and 500 are disposed among the first to fourth surfaces 101, 102, 103, and 104 of the body 100, connection reliability between the coil portion 300 and the first and second external electrodes 400 and 500 may be maintained constantly.

The via 320 may penetrate through the internal insulating layer 200 and may be in contact with the first coil pattern 311 and the second coil pattern 312 to electrically connect the first coil pattern 311 and the second coil pattern 312 to each other. For example, the via 320 may penetrate through one region of the support portion of the internal insulating layer 200. As a result, the coil portion 300 in the example embodiment may be formed as a single coil generating an electric field in a thickness direction T of the body 100 in the body 100.

The first coil pattern 311 and the second coil pattern 312 may be configured such that thicknesses may be less than widths. Accordingly, an aspect ratio (A/R), a ratio of a thickness to a width, of each turn of the first coil pattern 311 and the second coil pattern 312 may be less than 1. Thus, the coil component 1000 may have a relatively low thickness, and an electronic device including the coil component 1000 may also have a relatively low thickness.

At least one of the first coil pattern 311, the second coil pattern 312, the first main lead-out portion 311*a*, the first auxiliary lead-out portion 311*b*, the second main lead-out portion 312*a*, the second auxiliary lead-out portion 312*b*, and the via 320 may include at least one or more conductive layers.

As an example, when the second coil pattern 312, the second main lead-out portion 312*a*, the second auxiliary lead-out portion 312*b*, and the via 320 are formed by a plating method, the second coil pattern 312, the second main lead-out portion 312*a*, the second auxiliary lead-out portion 312*b*, and the via 320 each may include a seed layer and an electroplating layer. The seed layer may be formed by an electroless plating process or may be formed by a vapor deposition process such as a sputtering process. The electroplating layer may have a single-layer structure, or may have a multilayer structure. The electroplating layer having a multilayer structure may have a conformal film structure in which one of the electroplating layers is covered by the other electroplating layer, or may have a form in which one of the electroplating layers is disposed on one surface of the other plating layers.

The seed layers of the second coil pattern 312, the second main lead-out portion 312*a*, and the second auxiliary lead-out portion 312*b*, and the seed layer of the via 320 may be integrated with one another such that no boundary may be formed therebetween, but an exemplary embodiment thereof is not limited thereto. The electroplating layers of the second coil pattern 312, the second main lead-out portion 312*a*, and the second auxiliary lead-out portion 312*b* and the electroplating layer of the via 320 may be integrated with one another such that no boundary may be formed therebetween, but an exemplary embodiment thereof is not limited thereto.

As an example, when the coil portion 300 is formed by forming the first coil pattern 311 and the second coil pattern 312 separately and layering the first coil pattern 311 and the second coil pattern 312 on the internal insulating layer 200 (e.g., on opposing surfaces of the internal insulating layer 200), the via 320 may include a metal layer having a high melting point, and a metal layer having a low melting point relatively lower than the melting point of the metal layer having a high melting point. The metal layer having a low melting point may be formed of a solder including lead (Pb) and/or tin (Sn). The metal layer having a low melting point may be partially melted due to pressure and temperature generated during the layer process, and an inter-metallic compound layer (IMC layer) may be formed on boundaries between the metal layer having a low melting point and the first coil pattern 311, between the metal layer having a low melting point and the second coil pattern 312, and between the metal layer having a high melting point and the metal layer having a low melting point.

As an example, the first coil pattern 311 and the second coil pattern 312 may be formed on and protrude from a lower surface and an upper surface of the internal insulating layer 200, respectively. As another example, the first coil pattern 311 may be buried in a lower surface of the internal insulating layer 200, and a lower surface of the first coil pattern 311 may be exposed through the lower surface of the internal insulating layer 200, and the second coil pattern 312 may be formed on and protrude from the upper surface of the internal insulating layer 200. In this case, a concave portion may be formed on the lower surface of the first coil pattern 311, the first coil pattern 311 may be disposed in the concave portion, and a lower surface of the internal insulating layer 200 and a lower surface of the first coil pattern 311 may not be coplanar with each other.

As another example, the first coil pattern 311 may be buried in a lower surface of the internal insulating layer 200, and the lower surface of the first coil pattern 311 may be exposed through the lower surface of the internal insulating layer 200, and the second coil pattern 312 may be buried in an upper surface of the internal insulating layer 200, and the upper surface of the second coil pattern 312 may be exposed through the upper surface of the internal insulating layer 200.

The first coil pattern 311, the second coil pattern 312, the first main lead-out portion 311*a*, the first auxiliary lead-out portion 311*b*, the second main lead-out portion 312*a*, the second auxiliary lead-out portion 312*b*, and a via 320 may be formed of a conductive material such as copper (Cu), aluminum (Al), silver (Ag), tin (Sn), gold (Au), nickel (Ni), lead (Pb), titanium (Ti), or alloys thereof, but an example of the material is not limited thereto.

The first and second external electrodes 400 and 500 may be disposed on the sixth surface 106 of the body 100 and may be spaced apart from each other, and may be connected to the coil portion 300. For example, the first external electrode 400 may include a first connection portion 410 connected to the first main lead-out portion 311*a* of the coil portion 300 and disposed on the first surface 101, and a first extended portion 420 extending onto the sixth surface 106 of the body 100 from the first connection portion 410. The second external electrode 500 may include a second connection portion 510 disposed on the second surface 102 of the body 100 and connected to the second main lead-out portion 312*a* of the coil portion 300, and a second extended portion 520 extending onto the sixth surface 106 of the body 100 from the second connection portion 510. The first extended portion 420 and the second extended portion 520 disposed on the sixth surface 106 of the body 100 may be spaced apart from each other to prevent shorts between the first external electrode 400 and the second external electrode 500.

The first and second external electrodes 400 and 500 may be formed through a vapor deposition process such as a sputtering process, a plating process, or a paste printing process. When the first and second external electrodes 400 and 500 are formed, the connection portions 410 and 510 and the extended portions 420 and 520 may be formed through separate processes, and boundaries may be formed therebetween. Alternatively, the connection portions 410 and 510 and the extended portions 420 and 520 may be formed through the same process such that boundaries may not be formed therebetween, and the connection portions 410 and 510 and the extended portions 420 and 520 may be integrated with each other.

The first and second external electrodes 400 and 500 may be formed of copper (Cu), aluminum (Al), silver (Ag), tin (Sn), gold (Au), nickel (Ni), lead (Pb), titanium (Ti), or alloys thereof, but an example of the material is not limited thereto. The first and second external electrodes 400 and 500 each may have a single layer structure, or may have a structure including a plurality of layers. When the first and second external electrodes 400 and 500 have a structure including a plurality of layers, the first and second external electrodes 400 and 500 each may include a conductive resin layer including conductive powder and resin, a nickel-plated layer including nickel (Ni) and a tin-plated layer including tin (Sn), but an example embodiment thereof is not limited thereto.

The first and second external electrodes 400 and 500 may electrically connect the coil component 1000 to a printed circuit board, and the like, when the coil component 1000 is mounted on the printed circuit board. As an example, the coil component 1000 may be mounted after the sixth surface 106 of the body 100 is disposed towards a printed circuit board, and the coil component 1000 may easily be connected to the printed circuit board, and the like, through the first and second extended portions 420 and 520 disposed together on the sixth surface 106 of the body 100.

FIG. 1 illustrates the example in which the first and second external electrodes 400 and 500 each are a five-sided electrode (e.g., each are disposed on five surfaces of the body 110), but an example embodiment is not limited thereto. The first and second external electrodes 400 and 500 each may be a three-sided electrode or an L-shaped electrode differently from the example illustrated in FIG. 1.

Although not illustrated, the coil component 1000 may include the first coil pattern 311, the second coil pattern 312, the first main lead-out portion 311*a*, the first auxiliary lead-out portion 311*b*, the second main lead-out portion 312*a*, the second auxiliary lead-out portion 312*b*, and an insulating film formed along a surface of the internal insulating layer 200. The insulating film may cover surfaces of and thereby protect the first coil pattern 311, the second coil pattern 312, the first main lead-out portion 311*a*, the first auxiliary lead-out portion 311*b*, the second main lead-out portion 312*a*, and the second auxiliary lead-out portion 312*b*, and may insulate the first coil pattern 311, the second coil pattern 312, the first main lead-out portion 311*a*, the first auxiliary lead-out portion 311*b*, the second main lead-out portion 312*a*, and the second auxiliary lead-out portion 312*b* from the body 100. The insulating film may include a material such as parylene, and the like. An insulting material included in the insulating film may not be limited to any particular material. The insulating film may be formed through a vapor deposition process, or the like, but the method for forming the insulating film is not limited thereto. The insulating film may be formed by stacking an insulating material on both surfaces of the internal insulating layer 200 on which the first and second coil patterns 311 and 312 are disposed. The insulating film may not be provided depending on a design if desired.

Although not illustrated, at least one of the first coil pattern 311 and the second coil pattern 312 may have a plurality of layers. As an example, the coil portion 300 may have a structure in which a plurality of the first coil patterns 311 are formed, and one of the first coil patterns 311 may be layered on the other one of the first coil patterns 311. In this case, an additional insulating layer may be disposed between the plurality of first coil patterns 311, and a connection via penetrating through the additional insulating layer may be disposed to connect adjacent first coil patterns 311 to each other.

Another Embodiment

Figure 6:
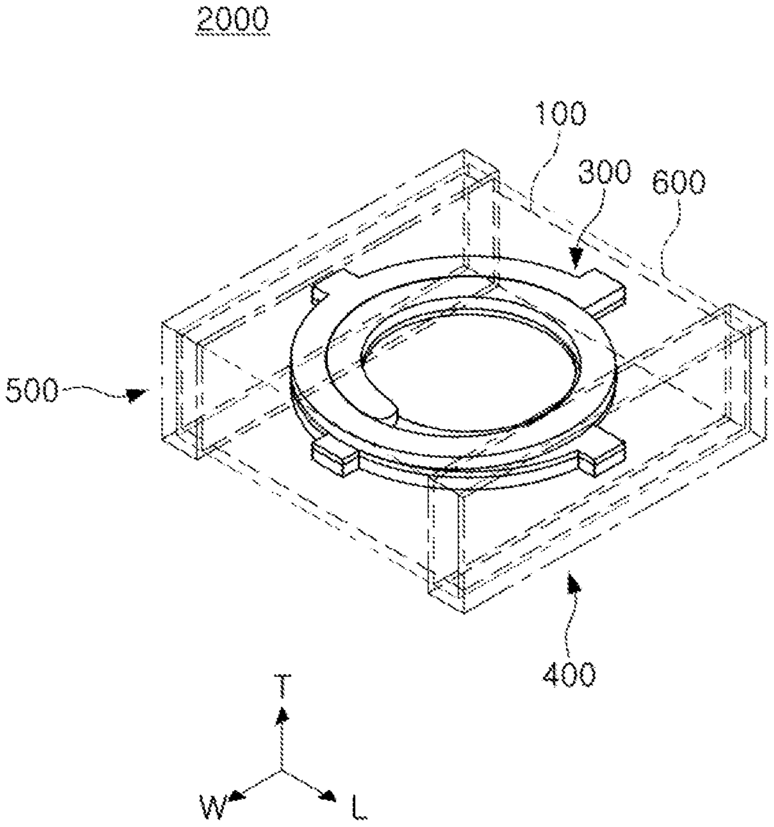
FIG. 6 is a schematic perspective diagram illustrating a coil component according to another example embodiment of the present disclosure.

FIG. 6 is a schematic perspective diagram illustrating a coil component according to an example embodiment.

Referring to FIGS. 1 to 6, a coil component 2000 in the example embodiment may further include an external insulating layer 600 as compared to the coil component 1000 described in the aforementioned example embodiment. Thus, in the description below, only the external insulating layer 600 will be described. As for the other elements of the example embodiment, the same descriptions described in the aforementioned example embodiment may be applied.

Referring to FIG. 6, the external insulating layer 600 may cover an external surface of the body 100 surrounding the body 100. The external insulating layer 600 may include openings exposing first and second main lead-out portions 311*a* and 312*a* to connect first and second external electrodes 400 and 500 to a coil portion 300.

For example, the external insulating layer 600 may include a first external insulating layer disposed on a first surface 101 of a body 100, a second external insulating layer disposed on a second surface 102 of the body 100, a third external insulating layer disposed on a third surface 103 of the body 100, a fourth external insulating layer 104 disposed on a fourth surface 104 of the body 100, a fifth external insulating layer disposed on a fifth surface 105 of the body 100, and a sixth external insulating layer disposed on a sixth surface 106 of the body 100. The first to sixth external insulating layers may be integrated with each other through a dipping process. Alternatively, two or more of the first to sixth external insulating layers may form a boundary. The first to sixth external insulating layers may be formed by coating surfaces of the body 100 with an insulating paste, or may be formed by layering insulating films on a surface of the body 100 and curing the insulating films.

The external insulating layer 600 including an opening may be used as a mask when the external electrodes 400 and 500 are formed on the body 100.

The external insulating layer 600 may include a thermoplastic resin such as a polystyrene resin, a vinyl acetate resin, a polyester resin, a polyethylene resin, a polypropylene resin, a polyamide resin, a rubber resin, an acrylic resin, and the like, a thermosetting resin such as a phenolic resin, an epoxy resin, a urethane resin, a melamine resin, an alkyd resin, and the like, a photosensitive resin, or an insulating resin such as a parylene resin, and the like.

The opening may be formed by, after forming the external insulating layer 600 to cover the first to sixth surfaces 101, 102, 103, 104, 105, and 106 of the body 100, exposing at least portions of two surfaces opposing each other among the first to fourth surfaces 101, 102, 103, and 104 of the body. Alternatively, the external insulating layer 600 may not be disposed on at least portions of two surfaces opposing each other among the first to fourth surfaces 101, 102, 103, and 104 of the body 100 to form the opening.

According to the aforementioned example embodiments, as it may not be necessary to specify the surface on which the external electrode is formed, costs and time for manufacturing a coil component may reduce.

While the exemplary embodiments have been shown and described above, it will be apparent to those skilled in the art that modifications and variations could be made without departing from the scope of the present invention as defined by the appended claims.

What is claimed is:

1. A coil component, comprising:
a body having one surface and another surface opposing each other, and a plurality of walls each connecting the one surface to the other surface;
an internal insulating layer disposed in the body; and
a coil portion disposed on the internal insulating layer, wherein the coil portion comprises:
first and second coil patterns disposed on opposing surfaces of the internal insulating layer, respectively,
a first main lead-out portion and a first auxiliary lead-out portion extending from the first coil pattern, and respectively exposed to a front surface and one side surface of the body connected to each other among the plurality of walls of the body, and
a second main lead-out portion and a second auxiliary lead-out portion extending from the second coil pattern, and respectively exposed to a rear surface and another side surface of the body connected to each other among the plurality of walls of the body.

2. The coil component of claim 1, wherein, when a distance between the front and rear surfaces of the body is A, and a distance between the one and other side surfaces of the body is B, an absolute value of a difference between A and B is 0.2 mm or less.

3. The coil component of claim 1, wherein the first and second main lead-out portions are only exposed to the front and rear surfaces of the body, respectively, and the first and second auxiliary lead-out portions are only exposed to the one and other side surfaces of the body, respectively.

4. The coil component of claim 1, wherein the internal insulating layer includes portions supporting the first and second main lead-out portions and the first and second auxiliary lead-out portions, and exposed to the front and rear surfaces and the one and other side surfaces of the body.

5. The coil component of claim 1, wherein the coil portion further includes a via penetrating through the internal insulating layer and connecting the first and second coil patterns.

6. The coil component of claim 1, further comprising:
first and second external electrodes disposed on the front and rear surfaces of the body, respectively, and connected to and in contact with the first and second main lead-out portions, respectively.

7. The coil component of claim 6, wherein the first and second external electrodes comprise:
first and second connection portions disposed on the front and rear surfaces of the body and connected to the first and second main lead-out portions, respectively, and
first and second extending portions extending to the one surface of the body from the first and second connection portions, respectively.

8. The coil component of claim 1, wherein thicknesses of the first and second coil patterns are greater than widths of the first and second coil patterns, respectively.

9. The coil component of claim 1, wherein exposed areas of the first and second main lead-out portions and the first and second auxiliary lead-out portions exposed to external surfaces of the body are substantially the same.

10. The coil component of claim 1, further comprising:
an external insulating layer disposed on the body to cover external surfaces of the body,
wherein the external insulating layer includes openings exposing the first and second main lead-out portions, respectively.

11. A coil component comprising:
a body;
an internal insulating layer disposed in the body; and
a coil disposed in the body, wherein the coil includes first and second coil patterns disposed on opposing first and second surfaces of the internal insulating layer, and includes at least one coil winding between opposing first and second ends thereof,
wherein the first end of the coil includes a first main lead-out portion and a first auxiliary lead-out portion exposed to different respective surfaces of the body at locations spaced apart from each other,
wherein the first auxiliary lead-out portion is on the first surface of the internal insulating layer,
wherein the second end of the coil includes a second main lead-out portion and a second auxiliary lead-out portion exposed to different respective surfaces of the body at locations spaced apart from each other,
wherein the second auxiliary lead-out portion is on the second surface of the internal insulating layer,
wherein the first auxiliary lead-out portion extends from the coil toward a surface of the body and contacts only the surface of the body, and
wherein the second auxiliary lead-out portion extends from the coil toward an other surface of the body and contacts only the other surface of the body.

12. The coil component of claim 11, wherein the first main lead-out portion, the first auxiliary lead-out portion, the second main lead-out portion, and the second auxiliary lead-out portion are exposed to different respective surfaces of the body at locations spaced apart from each other.

13. The coil component of claim 11, wherein the first main lead-out portion and the second main lead-out portion are exposed to opposing surfaces of the body, and
the first auxiliary lead-out portion and the second auxiliary lead-out portion are exposed to opposing surfaces of the body.

14. The coil component of claim 11, wherein the first main lead-out portion and the first auxiliary lead-out portion are exposed to respective surfaces of the body that are adjacent to each other.

15. The coil component of claim 11, wherein the first main lead-out portion and the first auxiliary lead-out portion are exposed to respective surfaces of the body that are adjacent to each other, and
the second main lead-out portion and the second auxiliary lead-out portion are exposed to respective surfaces of the body that are adjacent to each other and different from the surfaces exposing the first main lead-out portion and the first auxiliary lead-out portion.

16. The coil component of claim 11, further comprising:
the first coil pattern includes the first end having the first main lead-out portion on the first surface of the internal insulating layer, and
the second coil pattern includes the second end having the second main lead-out portion on the second surface of the internal insulating layer,
wherein the first and second coil patterns are connected to each other by a via extending through the internal insulating layer.

17. The coil component of claim 11, wherein the first and second main lead-out portions and the first and second auxiliary lead-out portions are each exposed to only one different respective surface of the body.

18. The coil component of claim 11, further comprising:
first and second external electrodes disposed on opposing surfaces of the body, wherein the first external electrode contacts only one of the first main lead-out portion and the first auxiliary lead-out portion, and the second external electrode contacts only one of the second main lead-out portion and the second auxiliary lead-out portion.

19. The coil component of claim 18, wherein the first and second external electrodes each extend from one of the opposing surfaces of the body to a same mounting surface of the body.

20. The coil component of claim 18, wherein the first and second external electrodes cover the opposing surfaces and surfaces of the body adjacent to the opposing surfaces.

21. A coil component comprising:

a body; and a coil disposed in the body, and includes at least one coil winding between opposing first and second ends thereof, wherein the first end of the coil includes a first main lead-out portion and a first auxiliary lead-out portion exposed to different respective surfaces of the body at locations spaced apart from each other, wherein the first auxiliary lead-out portion extends from the coil toward a surface of the body and contacts only the surface of the body, wherein the second end of the coil includes a second main lead-out portion and a second auxiliary lead-out portion exposed to different respective surfaces of the body at locations spaced apart from each other, wherein the second auxiliary lead-out portion extends from the coil toward an other surface of the body and contacts only the other surface of the body, and wherein the first and second auxiliary lead-out portions are on levels different from each other.

* * * * *